United States Patent
Hives et al.

(10) Patent No.: US 9,843,418 B2
(45) Date of Patent: Dec. 12, 2017

(54) FAULT TOLERANT RETRY SUBSYSTEM AND METHOD

(71) Applicant: Change Healthcare LLC, Alpharetta, GA (US)

(72) Inventors: Albert Hives, Oakland, CA (US); Chris Patterson, Oakland, CA (US)

(73) Assignee: Change Healthcare LLC, Alpharetta, GA (US)

( * ) Notice: Subject to any disclaimer, the term of this patent is extended or adjusted under 35 U.S.C. 154(b) by 75 days.

(21) Appl. No.: 14/612,880

(22) Filed: Feb. 3, 2015

(65) Prior Publication Data
US 2016/0224425 A1   Aug. 4, 2016

(51) Int. Cl.
| G06F 11/00 | (2006.01) |
| H04L 1/08 | (2006.01) |
| G06F 9/54 | (2006.01) |
| G06F 11/14 | (2006.01) |

(52) U.S. Cl.
CPC ............... *H04L 1/08* (2013.01); *G06F 9/542* (2013.01); *G06F 11/1402* (2013.01); *G06F 11/1443* (2013.01)

(58) Field of Classification Search
CPC ............... G06F 11/1412; G06F 9/542
See application file for complete search history.

(56) References Cited

U.S. PATENT DOCUMENTS

| 8,055,287 B1 * | 11/2011 | Upadhyay | H04W 4/001 370/230.1 |
| 8,254,971 B1 * | 8/2012 | Mikan | H04W 4/14 455/466 |
| 8,549,083 B2 * | 10/2013 | Cai | H04L 51/14 370/241 |
| 8,823,767 B2 * | 9/2014 | Varga | H04W 4/14 348/14.08 |
| 2007/0191035 A1 * | 8/2007 | Huggett | H04W 4/14 455/466 |
| 2012/0215328 A1 * | 8/2012 | Schmelzer | G06F 19/3481 700/91 |
| 2014/0189442 A1 * | 7/2014 | DeGraaf | G06F 21/554 714/48 |

* cited by examiner

*Primary Examiner* — Bryce Bonzo
*Assistant Examiner* — Jonathan Gibson
(74) *Attorney, Agent, or Firm* — Alston & Bird LLP

(57) ABSTRACT

A fault-tolerant retry subsystem, method and computer program product are provided in order to automatically retry to deliver a message. In the context of a fault-tolerant retry subsystem, processing circuitry is provided to receive notification that delivery of a message to a subscriber has failed. The processing circuitry also defines a time interval at which delivery of the message is to be retried. The message is to be subjected to a plurality of retry attempts in an instance in which the delivery of the message to the subscriber continues to fail. The time interval is defined in a manner that depends upon which of the plurality of retry attempts is to be performed. As such, the time interval varies between at least some of the retry attempts. The processing circuitry causes the delivery of the message to be retried following expiration the time interval.

20 Claims, 3 Drawing Sheets

FAULT TOLERANT RETRY SUBSYSTEM AND METHOD

TECHNOLOGICAL FIELD

An example embodiment of the present invention is directed to a fault-tolerant retry subsystem and method and, more particularly, to a fault-tolerant retry subsystem and method for automatically retrying to deliver a message following receipt of notification that delivery of the message to a subscriber has failed.

BACKGROUND

Computer systems routinely attempt to deliver messages to a wide variety of subscribers. In a health care system, for example, attempts may be made to deliver a message including clinical results to one or more subscribers, such as a subscriber that maintains an electronic medical record of the patient so as to permit the electronic medical record to be updated with the clinical results.

The delivery of a message to a subscriber may sometimes fail. The delivery of a message may fail for various reasons including, for example, the unavailability or the limited availability of a subscriber system. Alternatively, the delivery of a message may fail as a result of a network error, a format error or an error associated with authentication and/or credentialing, etc.

In an instance in which the delivery of a message has failed, a computer system may try to repeatedly deliver the message in an effort to successfully reach the subscriber. In this regard, the computer system may attempt to deliver the message a predefined number of times prior to considering the message to be undeliverable. In order to control the retry attempts, a computer system may update a counter that maintains a count of the number of retry attempts. These retry attempts may be made at fixed intervals or in response to manual input. Despite the repeated attempts to deliver the message, the delivery of the message may be considered to have failed in an instance in which the counter that maintains a count of the number of retry attempts that have been made equals or exceeds a predefined limit.

In instance in which the delivery of the message has failed, the computer system may be disadvantaged in that the subscriber does not receive notification of the message. In instances in which the subscriber is aware that the delivery of the message has failed, the computer system or the parties relying upon or otherwise utilizing the computer system may additionally suffer from a corresponding loss of reputation. Moreover, even if the computer system is capable of successfully delivering the message following one or more retry attempts, the overall efficiency with which the message was delivered may be diminished as a result of the processing effort and memory resources devoted to the scheduling and performance of the retry attempt as well as any manual input required to trigger the retry attempts.

BRIEF SUMMARY

A fault-tolerant retry subsystem, method and computer program product are provided in accordance with an example embodiment in order to automatically retry to deliver a message. The fault-tolerant retry subsystem, method and computer program product are configured to perform one or more retry attempts in an instance in which the delivery of the message to a subscriber has failed, and to do so in a manner that is efficient in terms of its consumption of processing and memory resources. Thus, the fault-tolerant retry subsystem, method and computer program product endeavor both to provide exemplary performance in terms of the delivery of messages to subscribers, while conserving the processing and memory resources utilized for retry attempts.

In an example embodiment, a fault-tolerant retry subsystem for automatically retrying to deliver messages is provided that includes processing circuitry configured to receive notification that delivery of a message to a subscriber has failed. The processing circuitry of an example embodiment is also configured to define a time interval at which delivery of the message is to be retried. In this regard, the message is to be subjected to a plurality of retry attempts in an instance in which the delivery of the message to the subscriber continues to fail. The time interval is defined in a manner that depends upon which of the plurality of retry attempts is to be performed. As such, the time interval varies between at least some of the retry attempts. The processing circuitry of this example embodiment is further configured to cause the delivery of the message to be retried following expiration the time interval.

The processing circuitry of an example embodiment is configured to define the time interval such that the time interval progressively increases as the message is subjected to additional retry attempts. For example, the time interval may progressively increase in a non-linear manner as the message is subjected to additional retry attempts. The processing circuitry of an example embodiment is further configured to maintain a count of retry attempts of a respective message and to halt further retry attempts in response to the count of retry attempts satisfying a predefined limit.

The processing circuitry of an example embodiment is further configured to cause a retry attempt to be scheduled in a secondary persistent storage in response to receipt of the notification that the delivery of the message has failed. In this example embodiment, the processing circuitry is further configured to reinstantiate the retry attempt in the primary memory following expiration at the time interval. For example, the processing circuitry of an example embodiment is configured to receive publication of an event associated with the retry attempt following expiration of the time interval and to reinstantiate the retry attempt in the primary memory in response to receipt of publication of the event. The processing circuitry of an example embodiment is configured to reinstantiate the retry attempt in an asynchronous manner.

In another example embodiment, a method for automatically retrying to deliver a message is provided that includes receiving notification that delivery of the message to a subscriber has failed. The method of this example embodiment also includes defining a time interval at which delivery of the message is to be retried. In this regard, the message is to be subjected to a plurality of retry attempts in an instance in which the delivery of the message to the subscriber continues to fail. In this regard, the method defines the time interval in a manner that is dependent upon which of the plurality of retry attempts is to be performed such that the time interval varies between at least some of the retry attempts. The method of this example embodiment further includes causing the delivery of the message to be retried following expiration of the time interval.

The method of an example embodiment defines the time interval such that the time interval progressively increases as the message is subjected to additional retry attempts. In this regard, the time interval of an example embodiment progressively increases in a non-linear manner as the message is subjected to additional retry attempts. In an example embodiment, the method also includes maintaining a count of retry attempts of a respective message and halting further retry attempts in response to the count of retry attempts satisfying a predefined limit.

A method of an example embodiment also includes causing a retry attempt to be scheduled in a secondary persistent storage in response to receipt of the notification that the delivery of the message has failed. In this example embodiment, the method also includes reinstantiating the retry attempt to the primary memory following expiration of the time interval. The method of an example embodiment may also include receiving publication of an event associated with the retry attempt following expiration of the time interval. In this regard, the retry attempt is reinstantiated in the primary memory in response to publication of the event. The method of an example embodiment is configured to reinstantiate the retry attempt in an asynchronous manner.

In the further example embodiment, a computer program product is provided that includes at least one non-transitory computer-readable storage medium having computer-executable program code portion stored therein with the computer-executable program code portions including program code instructions for receiving notification that delivery of the message to a subscriber has failed. The computer-executable program code portions of this example embodiment also include program code instructions for defining a time interval that which delivery of the message is to be retried. In this regard, the message is to be subjected to a plurality of retry attempts in an instances in which the delivery of the message to the subscriber continues to fail. The program code portions of this example embodiment define the time interval in a manner that is dependent upon which of the plurality of retry attempts is to be performed such that the time interval varies between at least some of the retry attempts. The computer-executable program code portions further include program code instructions for causing the delivery of the message to be retried following the expiration of the time interval.

The program code instruction of an example embodiment defines the time intervals such that time interval progressively increases as the message is subjected to additional retries attempts. For example, the time period of an example embodiment progressively increases in a non-linear manner as the message is subjected to additional retry attempts.

The computer-executable program code portions of an example embodiment further include program code instruction for causing a retry attempt to be scheduled in a secondary persistent storage in response to the receipt of the notification that delivery of the message has failed. The computer-executable program code portions of this example embodiment also include program code instructions for reinstantiating the retry attempt in a primary memory following expiration of the time interval, such as in an asynchronous manner. The computer-executable program code portions of this example embodiment also include program code instructions for receiving publication of an event associated with the retry attempt following expiration of the time interval. The retry attempt is reinstantiated in the primary memory in response to publication of the event in accordance with this example embodiment.

BRIEF DESCRIPTION OF THE DRAWINGS

Figure 1:
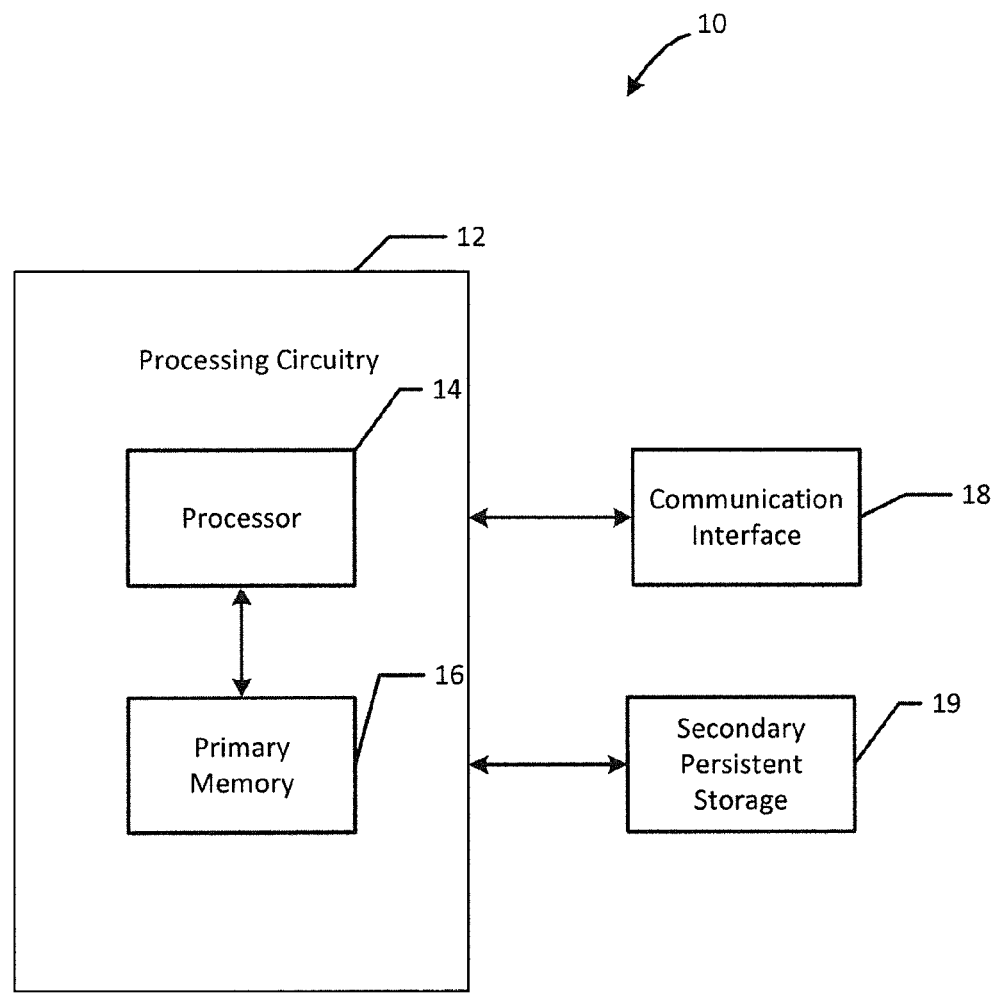
Figure 2:
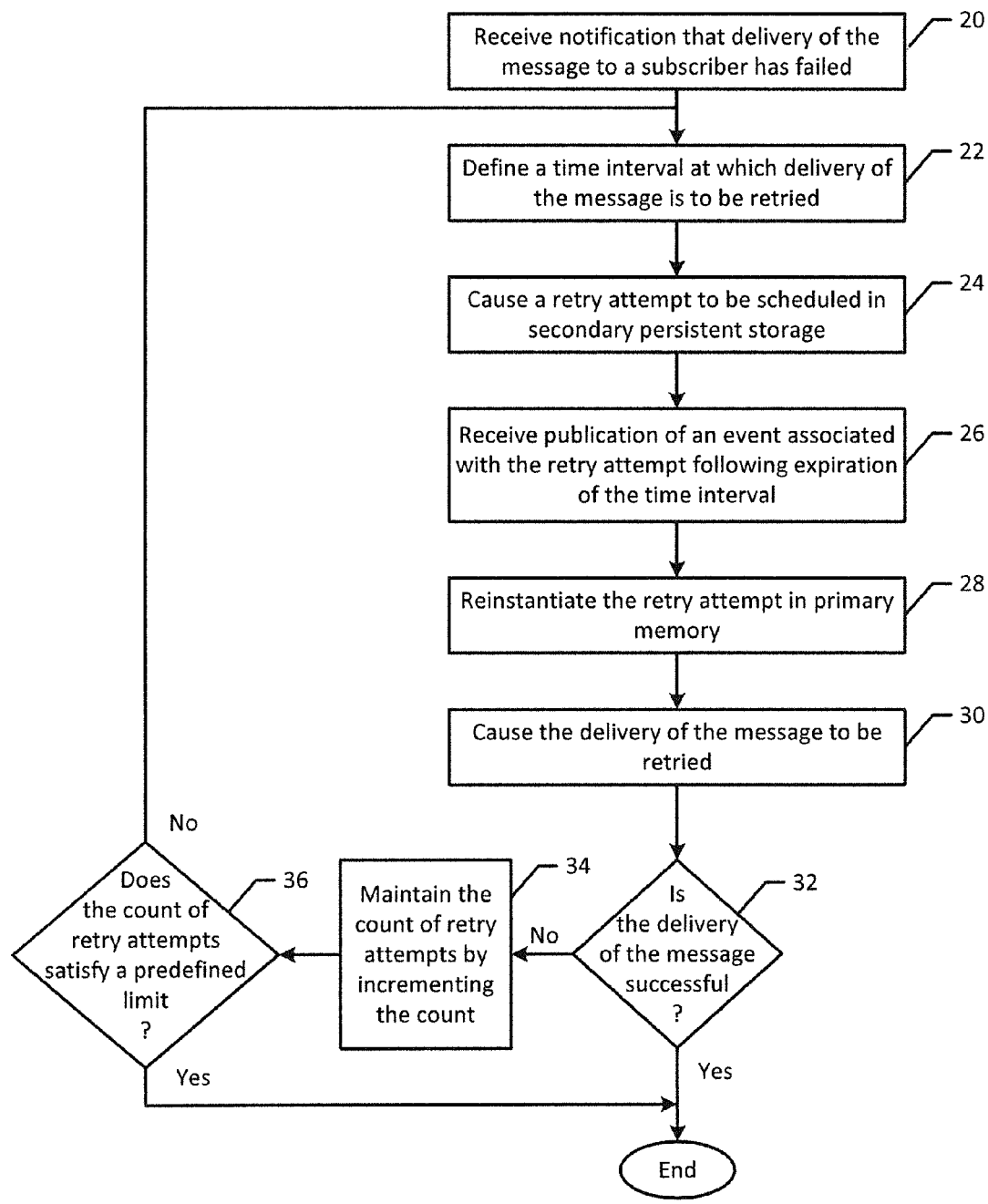
Figure 3:
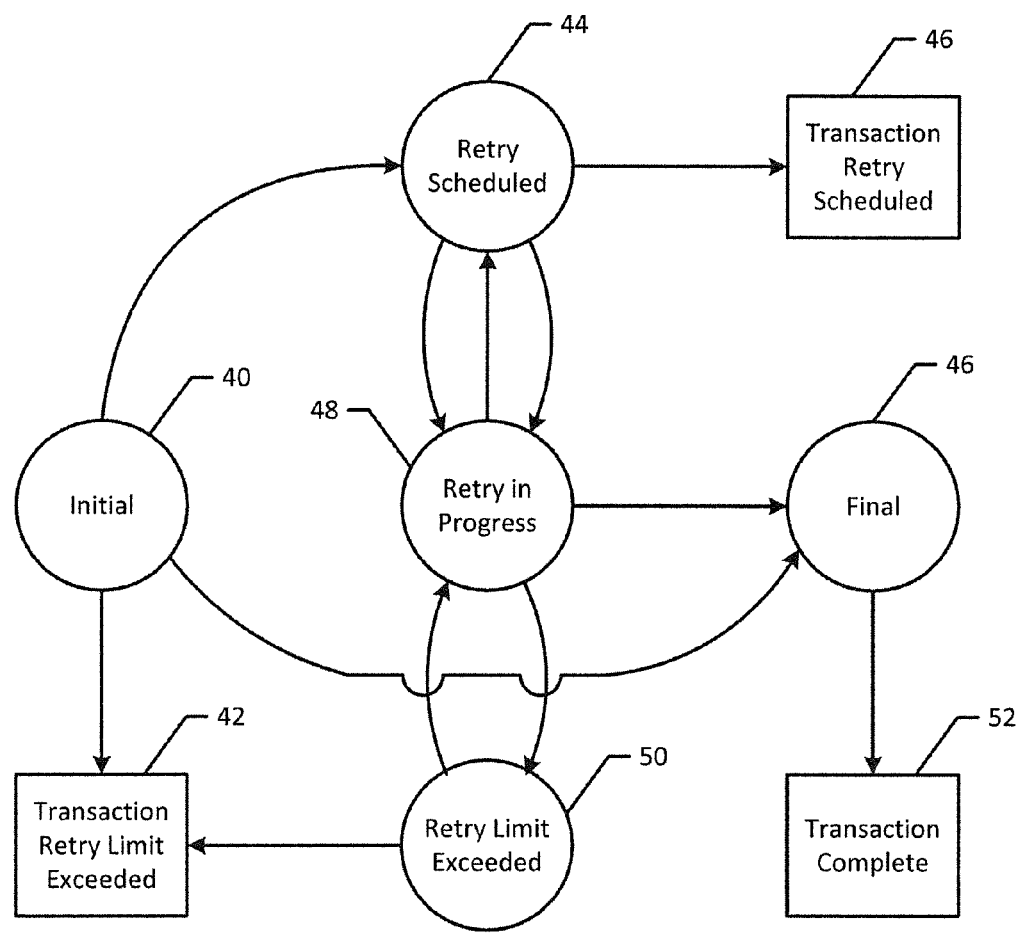

Having thus described aspects of the present disclosure in general terms, reference will now be made to the accompanying drawings, which are not necessarily drawn to scale, and wherein:

FIG. 1 is a block diagram of a fault-tolerant retry subsystem in accordance with an example embodiment of the present invention;

FIG. 2 is a flowchart illustrating operations performed, such as by the fault-tolerant retry subsystem of FIG. 1, in accordance with an example embodiment of the present invention; and FIG. 3 is a state diagram depicting performance of the fault-tolerant retry subsystem and method in accordance with an example embodiment of the present invention.

DETAILED DESCRIPTION

Some embodiments of the present invention will now be described more fully hereinafter with reference to the accompanying drawings, in which some, but not all embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information" and similar terms may be used interchangeably to refer to data capable of being transmitted, received and/or stored in accordance with embodiments of the present invention. Thus, use of any such terms should not be taken to limit the spirit and scope of embodiments of the present invention.

A fault-tolerant retry subsystem, method and computer program product are provided in accordance with an example embodiment of the present invention. The fault-tolerant retry subsystem, method and computer program product automatically retry to deliver a message to a subscriber in instances in which the prior delivery of the message to the subscriber has failed. The message that is to be delivered to the subscriber may be any of a wide variety of messages that is to be delivered to subscribers for any of a wide variety of purposes. For example, the messages to be delivered may be messages that are transmitted from a source to a destination in a healthcare system, such as messages transmitted from or between healthcare providers, healthcare facilities, payment system or the like. By way of example, the message may include a clinical result provided by a laboratory for delivery to a subscriber, such as a healthcare provider that maintains the electronic medical record (EMR) of the patient and that is to be updated with the clinical result.

An example of a fault-tolerant retry subsystem 10 is depicted in FIG. 1. The fault-tolerant retry subsystem may be embodied by a variety of different computer systems including a computer system associated with the source of the message or a computer system configured to deliver various messages from one or more sources to various subscribers. Regardless of the type of computer system that embodies the fault-tolerant retry subsystem, the fault-tolerant retry subsystem includes or is associated and in communication with processing circuitry 12 that is configurable to perform functions in accordance with one or more example embodiments disclosed herein. In this regard, the processing circuitry may be configured to perform and/or control performance of one or more functionalities of the fault-tolerant retry subsystem in accordance with various example embodiments, and thus may provide means for performing functionalities of the computing device. The processing circuitry may be configured to perform data processing, application execution and/or other processing and management services according to one or more example embodiments.

In some example embodiments, the processing circuitry 12 includes a processor 14 and, in some embodiments, such as that illustrated in FIG. 1, further includes memory, such as primary memory 16. The processing circuitry may also be in communication with or otherwise control a communication interface 18 for communicating with other computing systems. As such, the processing circuitry may be embodied as a circuit chip (e.g., an integrated circuit chip) configured (e.g., with hardware, software or a combination of hardware and software) to perform operations described herein.

The processor 14 may be embodied in a number of different ways. For example, the processor may be embodied as various processing means such as one or more of a central processing unit, a microprocessor or other processing element, a coprocessor, a controller or various other computing or processing devices including integrated circuits such as, for example, an ASIC (application specific integrated circuit), an FPGA (field programmable gate array), or the like. Although illustrated as a single processor, it will be appreciated that the processor may comprise a plurality of processors. The plurality of processors may be in operative communication with each other and may be collectively configured to perform one or more functionalities of the computing device as described herein. The plurality of processors may be embodied on a single computing device or distributed across a plurality of computing devices collectively configured to function as the computing device. In some example embodiments, the processor may be configured to execute instructions stored in the primary memory 16 or otherwise accessible to the processor. As such, whether configured by hardware or by a combination of hardware and software, the processor may represent an entity (e.g., physically embodied in circuitry—in the form of processing circuitry 12) capable of performing operations according to embodiments of the present invention while configured accordingly. Thus, for example, when the processor is embodied as an ASIC, FPGA or the like, the processor may be specifically configured hardware for conducting the operations described herein. Alternatively, as another example, when the processor is embodied as an executor of software instructions, the instructions may specifically configure the processor to perform one or more operations described herein.

The processing circuitry 12 may also include memory, such as primary memory 16, as shown in FIG. 1. In some example embodiments, the memory may include one or more non-transitory memory devices such as, for example, volatile and/or non-volatile memory that may be either fixed or removable. In this regard, the memory may comprise a non-transitory computer-readable storage medium. It will be appreciated that while the memory is illustrated as a single memory, the memory may comprise a plurality of memories. The memory may be configured to store information, data, applications, instructions and/or the like for enabling the computing device to carry out various functions in accordance with one or more example embodiments. For example, the memory may be configured to buffer input data for processing by the processor 14. Additionally or alternatively, the memory may be configured to store instructions for execution by the processor. Among the contents of the memory, applications may be stored for execution by the processor in order to carry out the functionality associated with each respective application. In some cases, the memory may be in communication with the processor via a bus or buses for passing information among components of the fault-tolerant retry subsystem 10.

In the illustrated embodiment, the memory includes primary memory 16. The primary memory generally serves as the main system memory and is accessed by the processor 14, such as a central processing unit, during the execution of the functions of the fault-tolerant retry subsystem 10. In addition to the primary memory, the fault-tolerant retry subsystem of the embodiment of FIG. 1 includes secondary persistent storage 19. In contrast to the primary memory, the secondary persistent storage is not routinely accessed by the processor, and, as such, may be somewhat slower to respond in comparison to the primary memory. For example, the secondary persistent storage may be embodied by a database, disk storage, a key value store, a structured query language (SQL) file or the like that has a slower response time in comparison to the primary memory. As such, the secondary persistent storage may be less expensive on a per byte basis than the primary memory. Additionally, the secondary persistent storage may be more readily available in larger quantities than the primary memory, which may be in greater or more frequent demand by the processor.

As noted above, the fault-tolerant retry subsystem 10 of the embodiment of FIG. 1 also includes a communication interface 18. The communication interface is configured to communicate with one or more subscribers in order to affect the delivery of messages thereto. Additionally, the communication interface of an example embodiment may be in communication with one or more sources of messages so as to receive the messages therefrom, which are then to be delivered to the respective subscribers. The communication interface may be any means such as a device or circuitry embodied in either hardware or a combination of hardware and software that is configured to receive and/or transmit messages from sources to subscribers. In this regard, the communication interface may include, for example, an antenna (or multiple antennas) and supporting hardware and/or software for enabling communications with a wireless communication network. Additionally or alternatively, the communication interface may include the circuitry for interacting with the antenna(s) to cause transmission of signals via the antenna(s) or to handle receipt of signals received via the antenna(s). In some environments, the communication interface may alternatively or also support wired communication.

The communication interface 18 may be configured to directly and/or indirectly communicate with the sources of messages and/or the subscribes in any of a number of different manners including, for example, any of a number of wireline or wireless communication or networking techniques. Examples of such techniques include, without limitation, Universal Serial Bus (USB), radio frequency (RF), Bluetooth (BT), infrared (IrDA), any of a number of different cellular (wireless) communication techniques such as any of a number of 2G, 2.5G, 3G, 4G or Long Term Evolution (LTE) communication techniques, local area network (LAN), wireless LAN (WLAN) techniques or the like. In accordance with various ones of these techniques, the communication interface can be coupled to and configured to communicate across one or more networks. The network (s) can comprise any of a number of different combinations of one or more different types of networks, including data and/or voice networks. For example, the network(s) can include one or more data networks, such as a LAN, a metropolitan area network (MAN), and/or a wide area network (WAN) (e.g., Internet), and include one or more voice networks, such as a public-switched telephone network (PSTN).

Referring now to FIG. 2, the operations performed in order to automatically retry to deliver a message are illustrated. As shown in block 20, the fault-tolerant retry subsystem 10 includes means, such as the processing circuitry 12, the processor 14, the communication interface 18 or the like, for receiving notification that delivery of the message to a subscriber has failed. Although the notification may be provided in various manners, the notification may be provided in the form of a negative acknowledgement (NACK) indicative of the failure of the delivery attempt to a subscriber.

In accordance with an example embodiment, the fault-tolerant retry subsystem 10 includes means, such as the processing circuitry 12, the processor 14 or the like, for defining a time interval at which delivery of the message is to be retried. See block 22 of FIG. 2. In this regard, the message is to be subjected to a plurality of retry attempts in an instance in which the delivery of the message to the subscriber continues to fail. The maximum number of retry attempts may be predefined. For example, the maximum number of retry attempts may be configurable, such as by a system administrator. In accordance with an example embodiment, the time interval is defined in a manner that is dependent upon which of the plurality of retry attempts is to be performed. As such, the time interval varies between at least some of the retry attempts and, in some embodiments, between each of the retry attempts. In other words, the retry attempts may be separated by different time intervals.

In an example embodiment, the processing circuitry 12 is configured to define the time interval such that the time interval progressively increases as a message is subjected to additional retry attempts. Thus, the time interval between the first and second retry attempts may be greater than the time interval between the initial delivery attempt and the first retry attempt. Likewise, the interval between the second and third retry attempts may be greater than the interval between the first and second retry attempts, and similarly, the time interval between the third and fourth retry attempts may be greater than time interval between the second and third retry attempts. The progressive increase in the time interval between retry attempts may be non-linear as the message is subjected to additional retry attempts. By way of example, not only is the time interval between the third and fourth retry attempts greater than the time interval between the second and third retry attempts, but the time interval between the third and fourth retry attempts is increased relative to the time interval between the second and third retry attempts by a different amount, such as a greater amount, than the amount by which the time interval between the second and third retry attempts increased relative to the time interval between the first and second retry attempts. In one particular example in which the delivery of a message is retried seven times, the time intervals between successive retry attempts may be as follows: five seconds, ten seconds, thirty seconds, 1 minute, 5 minutes, 1 hour and 5 hours.

Thus, the time interval not only progressively increases as the message is subjected to additional retry attempts, but the time interval progressively increases in a non-linear manner such that the difference between successive time intervals also progressively increases as the message is subjected to additional retry attempts. By progressively increasing the time interval as the message is subjected to additional retry attempts, the delivery of the message is repeatedly attempted to increase the likelihood of successful delivery to the subscriber, but the resources of the fault-tolerant retry subsystem 10 are conserved by not simply repeatedly attempting delivery of the message with the same small time interval between retry attempts. Instead, the retry attempts are spaced progressively further from one another in order to permit the error that is preventing successful delivery of the message to the subscriber to be resolved without unnecessarily consuming resources in the meantime.

As shown in block 30 of FIG. 2, the fault-tolerant retry subsystem 10 also includes means, such as the processing circuitry 12, the processor 14, the communication interface 18 or the like, for causing the delivery of the message to be retried following expiration of the time interval. As shown in block 32, the fault-tolerant retry subsystem of an example embodiment also includes means, such as the processing circuitry, the processor, the communication interface or the like, for determining if the delivery of the message was successful, such as based upon feedback from the network, such as a NACK in an instance in which the message delivery failed or an acknowledgement (ACK) in instance in which the message delivery was successful. In the event that the delivery of the message was successful, the fault-tolerant retry subsystem need not make any further retry attempts.

However, in an instance in which the delivery of the message is determined to have been unsuccessful, the fault-tolerant retry subsystem 10 of an example embodiment includes means, such as the processing circuitry 12, the processor 14 or the like, for maintaining a count of the number of retry attempts that have been attempted and for incrementing the count in response to an indication that the delivery of the message was not successful and another retry attempt has been completed. See block 34. The fault-tolerant retry subsystem of this example embodiment also includes means, such as the processing circuitry, the processor or the like, for determining whether the count of retry attempts satisfies a predefined limit. See block 36. In this regard, the predefined limit defines the maximum number of retry attempts that are to be attempted prior to determining that the message is undeliverable. In an instance in which the count of retry attempts satisfies the predefined limit, such as by equaling the predefined limit, the fault-tolerant retry subsystem is configured to consider the message to be undeliverable and may then record or otherwise log the undeliverable status of the message, such as in memory. However, if the count of retry attempts does not satisfy the predefined limit, such as by being less than the predefined limit, the fault-tolerant retry subsystem of an example embodiment is configured to repeat the foregoing process so as to again attempt delivery of the message, albeit following lapse of another time interval, such as a progressively greater time interval.

In an example embodiment, the fault-tolerant retry subsystem 10 utilizes the secondary persistent storage 19 to schedule the retry attempts in order to conserve the primary memory 16 and to take advantage of the less expensive storage provided by the secondary persistent storage. By utilizing the secondary persistent storage to schedule the retry attempts, the fault-tolerant retry subsystem also permits retry operations to be performed on a horizontally scaled set of machines that implement the secondary persistent storage. By utilizing a horizontally scaled set of machines, the delivery of a message may be retried by the next available machine, as opposed to requiring the delivery of the message to again be retried by the same machine, which may be experience a software error or a connectivity issue that prevents the respective machine from successfully delivering the message. Further, the storage of retry attempts in secondary persistent storage allows applications to query the status of a specific message and subscriber combination and also provides for the option of manually initiating the retry operation.

As such, the fault-tolerant retry subsystem 10 of this example embodiment includes means, such as the processing circuitry 12, the processor 14 or the like, for causing a retry attempt to be scheduled in the secondary persistent storage 19 in response to receipt of the notification that the delivery of the message has failed. See block 24 of FIG. 2. In this example embodiment, the fault-tolerant retry subsystem is also configured to reinstantiate the retry attempt in the primary memory 16 following expiration the time interval. See block 28. For example, upon expiration of the time interval, an event may be published, such as by the secondary persistent storage, with the event being associated with the retry attempt. As shown in block 26, the fault-tolerant retry subsystem of this example embodiment includes means, such as the processing circuitry 12, the processor 14 or the like, for receiving publication of the event associated with the retry attempt following expiration the time interval with the processing circuitry then configured to reinstantiate the retry attempt in the primary memory in response to the publication of the event. As indicated by the foregoing example, the fault-tolerant retry subsystem, such as the processing circuitry, of an example embodiment is configured to reinstantiate a retry attempt in the primary memory in an asynchronous manner.

In regard to causing a retry attempt to be scheduled in the secondary persistent storage 19, an indication of the retry attempt and the time interval that is to elapse prior to effectuating the retry attempt may be stored by the secondary persistent storage. In this regard, the time interval may be stored in terms of the time interval and an indication of the time at which the prior delivery attempt was made and from which the time interval commences or, the time interval may be stored in terms of the time at which the next retry attempt is to be effectuated. Regardless, by causing the retry attempt to be scheduled in the secondary persistent storage, the scheduling of the retry attempt does not consume primary memory 16 and thus may be stored and monitored in a more efficient and less expensive manner. However, once the time interval has elapsed and the retry attempt is to be effectuated, an event associated with the retry attempt may be published so as to facilitate the reinstantiation of the retry attempt in the primary memory in an asynchronous manner. Thus, the delivery of the message may then again be attempted following reinstantiation of the retry attempt to the primary memory without having had to devote the processing resources and the primary memory resources to maintain the retry attempt during the time interval between retry attempts.

The fault-tolerant retry subsystem 10 of an example embodiment may be embodied as a state machine. An example of a state machine embodied by the fault-tolerant retry subsystem in accordance with an example embodiment is depicted in FIG. 3 in which the plurality of states are represented by circles and published events are represented by rectangles. Beginning from an initial state 40, the delivery of a message to a subscriber may initially be attempted. In instance in which the delivery of the message is unsuccessful, a determination is made, such as by the processing circuitry 12, as to whether the delivery of the message should be retried, that is, whether there should be a retry attempt for the message. In an instance in which the predefined limit on the number of retry attempts has been reached or exceeded, the initial state may transition to an event 42 associated with the transaction retry limit having been exceeded. As such, an event indicative of the retry limit being exceeded may be published, thereby indicating that the delivery of the message has failed which may, in turn be logged or otherwise recorded by the fault-tolerant retry subsystem.

However, if one or more retry attempts are permitted, such as in an instance in which the number of retry attempts does not equal or exceed a predefined limit, the initial state 40 transitions to a retry scheduled state 44 that serves to schedule the retry attempt following the lapse of a time interval. As noted above, the retry attempt may be scheduled in the secondary persistent storage 19. Once the time interval has elapsed, a transaction retry schedule event 46 may be published, thereby causing the retry attempt to be reinstantiated in the primary memory 16. As a result, the state may transition from the retry scheduled state to the retry in progress state 48 so as to cause the delivery of the message to be retried. In an instance in which the retry attempt is successful with the message being delivered to the subscriber, the state may transition from the retry in progress state to the final state 46 and the transaction complete event 52 may be published, such as to permit logging or other recordation of the successful delivery of the message to the subscriber.

However, in an instance in which the retry attempt is unsuccessful, a determination may again be made, such as by the processing circuitry 12, as to whether the predefined limit of retry attempts has been reached or exceeded. In an instance in which the predefined number of retry attempts has been reached or exceeded, the state may transition from the retry in progress state 48 to the retry limit exceeded state 50 which can, in turn, cause a transaction retry limit exceeded event 42 to be published, such as for logging or other recordation. However, in an instance in which the predefined number of retry attempts has not been reached or exceeded, the state may transition again from the retry in progress state to the retry scheduled state 44 for scheduling the next retry attempt following the lapse of another time interval. By configuring the fault-tolerant retry subsystem to operate as a state machine, the processing and memory resources of the processing circuitry may be conserved as a result the asynchronous operation and the utilization of the secondary persistent storage 19.

In addition to the retry attempts that are scheduled and effectuated as described above, the fault-tolerant retry subsystem 10 of an example embodiment is configured to also permit retry attempts to be performed in response to user input. For example, while in either the retry scheduled state 44 or the retry limit exceeded state 50, user input may be received that instructs the fault-tolerant retry subsystem, such as the processing circuitry 12, to conduct a retry attempt. For example, the state may transition from the retry scheduled state to the retry in progress state 48 as a result of user input even though the time interval has not yet elapsed. As another example, the state may transition from the retry limit exceeded state to the retry in progress state as a result of user input even though the predefined limit of retry attempts has already been exceeded. In response to the user input and the transition from either the retry scheduled state or the retry limit exceeded state to the retry in progress state 48, the retry attempt is caused to be conducted with subsequent events and state transitions occurring in the manner described above.

As shown in FIG. 3, the fault-tolerant retry subsystem 10, such as the processing circuitry 12, of an example embodiment is configured to transition from the initial state 40 to the final state 46 in an instance in which a message has previously be successfully delivered, thereby avoiding replay of the message to the subscriber. In this regard, in an instance in which the delivery of a message that was previously successfully delivered is manually retried, there is no retry record present (since the message was previously successfully delivered) such that retry begins with the creation of a new retry record in the initial state. However, the state transition from the initial state to the final state in an instance in which manual retry is not permitted, such as in an instance in which the message for which manual retry is requested has not faulted (and, instead, was previously successfully delivered), prevents the message from being replayed to the subscriber which would cause duplicate information to be submitted to the destination system.

As described above, FIG. 2 is a flowchart of a fault-tolerant retry subsystem 10, method and computer program product according to example embodiments of the invention. It will be understood that each block of the flowchart, and combinations of blocks in the flowchart, may be implemented by various means, such as hardware and/or a computer program product comprising one or more computer-readable mediums having computer readable program instructions stored thereon. For example, one or more of the procedures described herein may be embodied by computer program instructions of a computer program product. In this regard, the computer program product(s) which embody the procedures described herein may be stored by one or more memory devices 16 of a computing device and executed by processor 14 of the fault-tolerant retry subsystem. In some embodiments, the computer program instructions comprising the computer program product(s) which embody the procedures described above may be stored by memory devices of a plurality of computing devices. As will be appreciated, any such computer program product may be loaded onto a computer or other programmable apparatus to produce a machine, such that the computer program product including the instructions which execute on the computer or other programmable apparatus creates means for implementing the functions specified in the flowchart block(s). Further, the computer program product may comprise one or more computer-readable memories on which the computer program instructions may be stored such that the one or more computer-readable memories can direct a computer or other programmable apparatus to function in a particular manner, such that the computer program product comprises an article of manufacture which implements the function specified in the flowchart block(s). The computer program instructions of one or more computer program products may also be loaded onto a computer or other programmable apparatus to cause a series of operations to be performed on the computer or other programmable apparatus to produce a computer-implemented process such that the instructions which execute on the computer or other programmable apparatus implement the functions specified in the flowchart block(s).

Accordingly, blocks or steps of the flowchart support combinations of means for performing the specified functions and combinations of steps for performing the specified functions. It will also be understood that one or more blocks of the flowchart, and combinations of blocks in the flowchart, may be implemented by special purpose hardware-based computer systems which perform the specified functions or steps, or combinations of special purpose hardware and computer program product(s).

The above described functions may be carried out in many ways. For example, any suitable means for carrying out each of the functions described above may be employed to carry out embodiments of the invention. In one embodiment, a suitably configured processing circuitry 12 may provide all or a portion of the elements of the invention. In another embodiment, all or a portion of the elements of the invention may be configured by and operate under control of a computer program product. The computer program product for performing the methods of embodiments of the invention includes a computer-readable storage medium, such as the non-volatile storage medium, and computer-readable program code portions, such as a series of computer instructions, embodied in the computer-readable storage medium.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:

1. A fault-tolerant retry subsystem for automatically retrying to deliver a message, the fault-tolerant retry subsystem comprising a processing circuitry, wherein the processing circuitry comprises a processor and a primary memory accessed by the processor during execution of functions of the fault-tolerant retry subsystem, wherein the processing circuitry is configured to:
   receive notification that delivery of the message to a subscriber has failed;
   define a time interval at which delivery of the message is to be retried, wherein the message is to be subjected to a plurality of retry attempts in an instance in which the delivery of the message to the subscriber continues to fail, and wherein the time interval is defined in a manner that is dependent upon which of the plurality of retry attempts is to be performed such that the time interval varies between at least some of the retry attempts;
   cause a retry attempt to be scheduled in a secondary persistent storage in response to receipt of the notification that the delivery of the message has failed and following definition of the time interval, wherein the secondary persistent storage is slower to respond than the primary memory;
   following scheduling of the retry attempt in the secondary persistent storage and in response to notification of the retry attempt by the secondary persistent storage following expiration of the time interval, reinstantiate the retry attempt in the primary memory; and
   cause the delivery of the message to be retried following expiration of the time interval and reinstantiation of the retry attempt.

2. A fault-tolerant retry subsystem according to claim 1 wherein the processing circuitry is configured to define the time interval by defining the time interval such that the time interval progressively increases as the message is subjected to additional retry attempts.

3. A fault-tolerant retry subsystem according to claim 2 wherein the time interval progressively increases in a non-linear manner as the message is subjected to additional retry attempts.

4. A fault-tolerant retry subsystem according to claim 1 wherein the processing circuitry is configured to receive publication of an event associated with the retry attempt following expiration of the time interval, wherein the retry attempt is reinstantiated in the primary memory in response to receipt of publication of the event.

5. A fault-tolerant retry subsystem according to claim 1 wherein the processing circuitry is configured to reinstantiate the retry attempt in an asynchronous manner.

6. A fault-tolerant retry subsystem according to claim 1 wherein the processing circuitry is further configured to:
    maintain a count of retry attempts of a respective message; and
    halt further retry attempts in response to the count of retry attempts satisfying a predefined limit.

7. A fault-tolerant retry subsystem according to claim 1 wherein the secondary persistent storage is implemented by a horizontally scaled set of machines.

8. A method of a fault-tolerant retry subsystem for automatically retrying to deliver a message, wherein the fault-tolerant retry subsystem comprises a processor and a primary memory accessed by the processor during execution of functions of the fault-tolerant retry subsystem, and wherein the method comprises:
    receiving notification that delivery of the message to a subscriber has failed;
    defining a time interval at which delivery of the message is to be retried, wherein the message is to be subjected to a plurality of retry attempts in an instance in which the delivery of the message to the subscriber continues to fail, and wherein defining the time interval comprises defining the time interval in a manner that is dependent upon which of the plurality of retry attempts is to be performed such that the time interval varies between at least some of the retry attempts;
    causing a retry attempt to be scheduled in a secondary persistent storage in response to receipt of the notification that the delivery of the message has failed and following definition of the time interval, wherein the secondary persistent storage is slower to respond than the primary memory;
    following scheduling of the retry attempt in the secondary persistent storage and in response to notification of the retry attempt by the secondary persistent storage following expiration of the time interval, reinstantiating the retry attempt in the primary memory; and
    causing the delivery of the message to be retried following expiration of the time interval and reinstantiation of the retry attempt.

9. A method according to claim 8 wherein defining the time interval further comprises defining the time interval such that the time interval progressively increases as the message is subjected to additional retry attempts.

10. A method according to claim 9 wherein the time interval progressively increases in a non-linear manner as the message is subjected to additional retry attempts.

11. A method according to claim 8 further comprising receiving publication of an event associated with the retry attempt following expiration of the time interval, wherein the retry attempt is reinstantiated in the primary memory in response to publication of the event.

12. A method according to claim 8 wherein reinstantiating the retry attempt is performed asynchronously.

13. A method according to claim 8 further comprising:
    maintaining a count of retry attempts of a respective message; and
    halting further retry attempts in response to the count of retry attempts satisfying a predefined limit.

14. A method according to claim 8 wherein the secondary persistent storage is implemented by a horizontally scaled set of machines.

15. A computer program product of a fault-tolerant retry subsystem, wherein the fault-tolerant retry subsystem comprises a processor and a primary memory accessed by the processor during execution of functions of the fault-tolerant retry subsystem, and wherein the computer program product comprises at least one non-transitory computer-readable storage medium having computer-executable program code portions stored therein, the computer-executable program code portions comprising program code instructions for:
    receiving notification that delivery of the message to a subscriber has failed;
    defining a time interval at which delivery of the message is to be retried, wherein the message is to be subjected to a plurality of retry attempts in an instance in which the delivery of the message to the subscriber continues to fail, and wherein defining the time interval comprises defining the time interval in a manner that is dependent upon which of the plurality of retry attempts is to be performed such that the time interval varies between at least some of the retry attempts;
    causing a retry attempt to be scheduled in a secondary persistent storage in response to receipt of the notification that the delivery of the message has failed and following definition of the time interval, wherein the secondary persistent storage is slower to respond than the primary memory;
    reinstantiating the retry attempt in the primary memory following scheduling of the retry attempt in the secondary persistent storage and in response to notification of the retry attempt by the secondary persistent storage following expiration of the time interval; and
    causing the delivery of the message to be retried following expiration of the time interval and reinstantiation of the retry attempt.

16. A computer program product according to claim 15 wherein the program code instructions for defining the time interval further comprise program code instructions for defining the time interval such that the time interval progressively increases as the message is subjected to additional retry attempts.

17. A computer program product according to claim 16 wherein the time interval progressively increases in a non-linear manner as the message is subjected to additional retry attempts.

18. A computer program product according to claim 15 further comprising program code instructions for receiving publication of an event associated with the retry attempt following expiration of the time interval, wherein the retry attempt is reinstantiated in the primary memory in response to publication of the event.

19. A computer program product according to claim 15 wherein reinstantiation of the retry attempt is performed asynchronously.

20. A computer program product according to claim 15 wherein the secondary persistent storage is implemented by a horizontally scaled set of machines.

* * * * *